Dec. 21, 1943. J. W. TODD 2,337,509
MICROMETER GAUGE
Filed Dec. 30, 1941 2 Sheets-Sheet 1

INVENTOR
John William Todd
By Harris & Bateman
ATTORNEYS

Dec. 21, 1943.   J. W. TODD   2,337,509
MICROMETER GAUGE
Filed Dec. 30, 1941   2 Sheets-Sheet 2

INVENTOR
John William Todd
By Marus + Bateman
ATTORNEYS

Patented Dec. 21, 1943

2,337,509

UNITED STATES PATENT OFFICE 2,337,509

MICROMETER GAUGE

John William Todd, City Road, London, England

Application December 30, 1941, Serial No. 424,975
In Great Britain January 2, 1941

6 Claims. (Cl. 33—148)

This invention relates to micrometer gauges or comparators and has for its object to provide an improved gauge which is particularly designed for the accurate measurement of small holes and other apertures not easily measured by instruments of known type but which is also capable of use for external measurement.

According to the invention the improved micrometer gauge includes a pair of jaws adapted to be inserted in the aperture or placed across the surfaces to be measured, one of said jaws being carried by a pivoted arm adapted to be adjusted by hand to set the jaws and also to actuate an indicating device capable of showing any deviation from a predetermined measurement.

In order that the invention may be more fully understood reference will now be made to the accompanying drawings which illustrate two embodiments of the invention and wherein—

Figure 1:
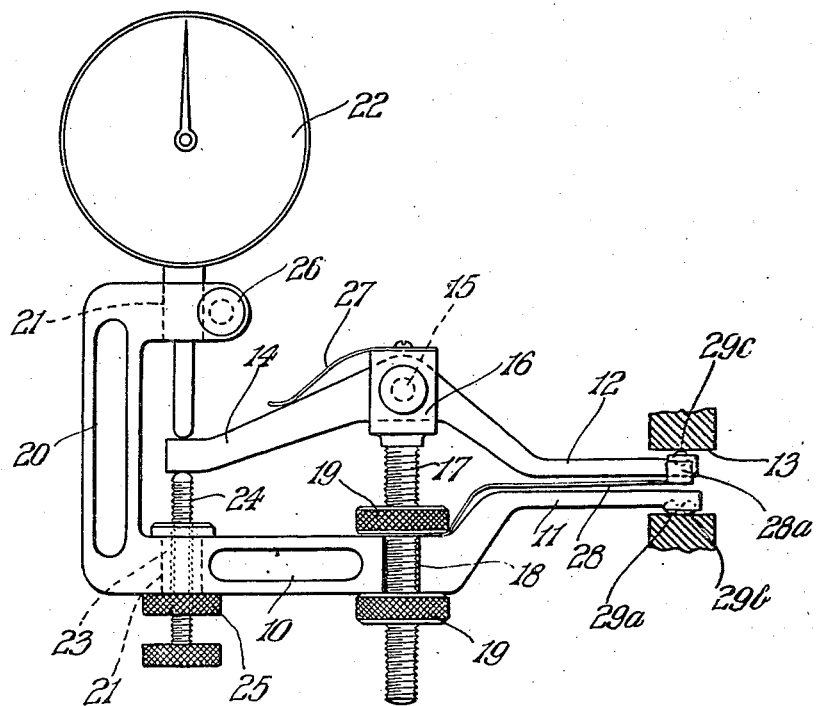
Fig. 1 shows the improved gauge in its simplest form.

Referring to Fig. 1, the improved micrometer gauge comprises a frame 10 one end 11 of which is formed to constitute one of a pair of jaws 11, 12 which are adapted to be set to a predetermined measurement and inserted in the aperture 13 to be measured. The second jaw 12 is arranged to lie substantially parallel to the jaw 11 and is formed integral with a lever arm 14 which is pivotally mounted at 15 in a fork 16 formed on the upper end of a standard 17, said standard being mounted for vertical adjustment within an aperture or recess 18 formed in the frame 10 and being threaded to receive two knurled nuts 19 by which it is clamped in the desired position of adjustment.

The end of the frame 10 remote from the jaws is formed integral with a bracket or U-shaped structure 20 the limbs of which are bored as at 21 to provide sockets for a dial test indicator 22 and a removable bush 23 respectively. The stem of the indicator bears upon the upper side of the lever arm 14 at the end remote from the jaws whilst the underside of said arm is engaged by an adjusting screw 24 extending through and in screw-threaded engagement with the bush 23, said screw being used for setting the jaws and being provided with a locknut 25 for securing it in its adjusted position. Means may be provided for clamping the dial test indicator in the bracket structure 20, for example, the end of the bracket could be slotted longitudinally and a clamping screw 26 provided, and similar or other means may also be provided for securing the bush 23 against displacement.

Preferably spring means, for example a blade spring 27 engaging the lever arm 14, is provided to urge the jaws apart to the limit determined by the setting of the screw 24 and, when the gauge is to be used for measuring cylindrical apertures, a spring blade 28 is provided which is formed at its sides with upwardly extending arms or lugs 28a adapted to engage the aperture wall on either side of the upper jaw 12, said spring device being used to keep the fixed jaw 11 pressed against one side of the aperture wall to be measured and to centralize the jaws 11, 12.

The device above described is set initially by inserting the jaws between the points of a standard gauge, micrometer or other device giving the required dimension and by adjusting the screw 24 and standard 17 until the arm 14 is positioned to set the jaws substantially parallel and at the desired distance apart. When, thereafter, the jaws are inserted in a hole or other aperture any slight deviation below the pre-set measurement will rock the lever arm 14 slightly and the stem of the test indicator will be lifted whereby an indication of the deviation is given on the dial.

The gauge above described is of particular use in measuring small cylindrical apertures of the order of ¼ inch to ¾ inch internal diameter as the jaws can be inserted into the aperture to a sufficient extent to indicate whether it is truly cylindrical or slightly tapered. To ensure accuracy the outer or inner surface of each jaw may carry a ball-point or similar member for the purpose of making only point contact with the surface of the aperture to be measured. In the preferred arrangement the fixed jaw is provided with two-ball-points 29a, 29b along its length and the movable jaw with one ball point 29a disposed mid-way between the ball points on the fixed jaw. This arrangement enables the maximum or minimum dimensions in one direction to be very easily located.

Figure 2:
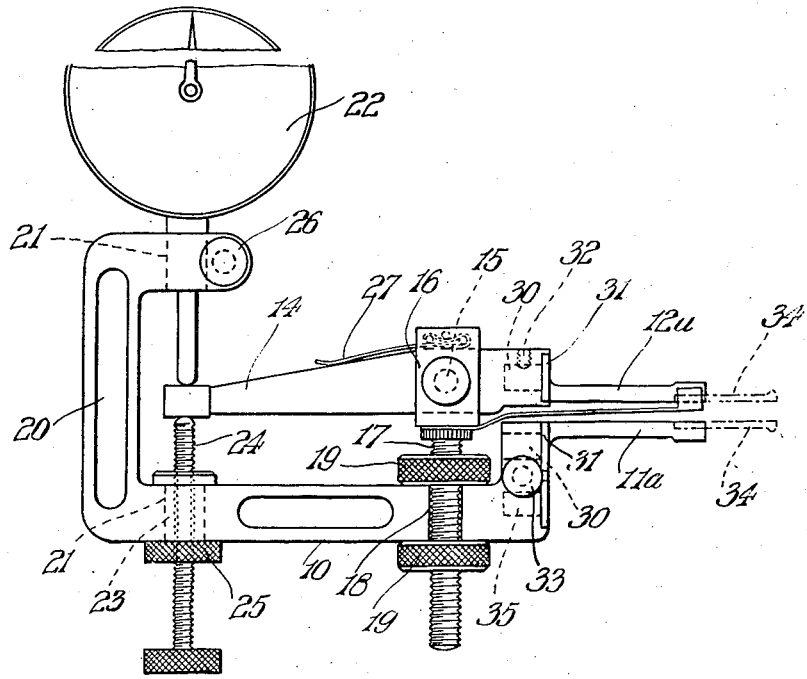
Fig. 2 shows a modified form of gauge capable of measuring over a large range and Fig. 3 shows the method of assembling the gauge of Fig. 2 to adapt it for external measuring.

The form of the invention according to Fig. 2 differs from that shown in Fig. 1 in that the jaws 11a, 12a are detachably mounted on the frame 10 and lever arm 14 thus rendering them interchangeable with jaws of different size or form. The jaws may be mounted in any convenient manner but in the preferred form they are each provided at the rear end with a stud 30 which is fixedly secured within a socket formed in the lever arm or frame member. A flange 31 may also be provided on each jaw, said flange being adapted to seat in a correspondingly-shaped recess formed in the frame member or lever arm to ensure accurate mounting of said jaws. The jaws may be secured in their supports by a grub-screw 32 or by slotting the support longitudinally and using a clamping screw 33 or in any other suitable manner.

The jaws 11a, 12a may be provided with ball or other contact points as in the form previously described or, to enable the device to be used for the measurment of different shaped apertures including internal screw threads both core and effective diameters, internally recessed bores and the like, the outer ends of the jaws may carry detachable nibs 34 which make the actual contacts with the surfaces to be measured.

An additional socket 35 may be provided in the frame member to form an alternative mounting for the jaw 11a and thus extend the range of use of the instrument and, if desired, a similar dual mounting may be provided on the lever arm 14 for the jaw 12a.

The other parts of the gauge are constructed and assembled as in the form shown in Fig. 1 with the exemption that a modified form of blade spring 27 is used which can be easily reversed to bear upon the lever arm on the opposite side of the pivot for a purpose now to be described.

Figure 3:
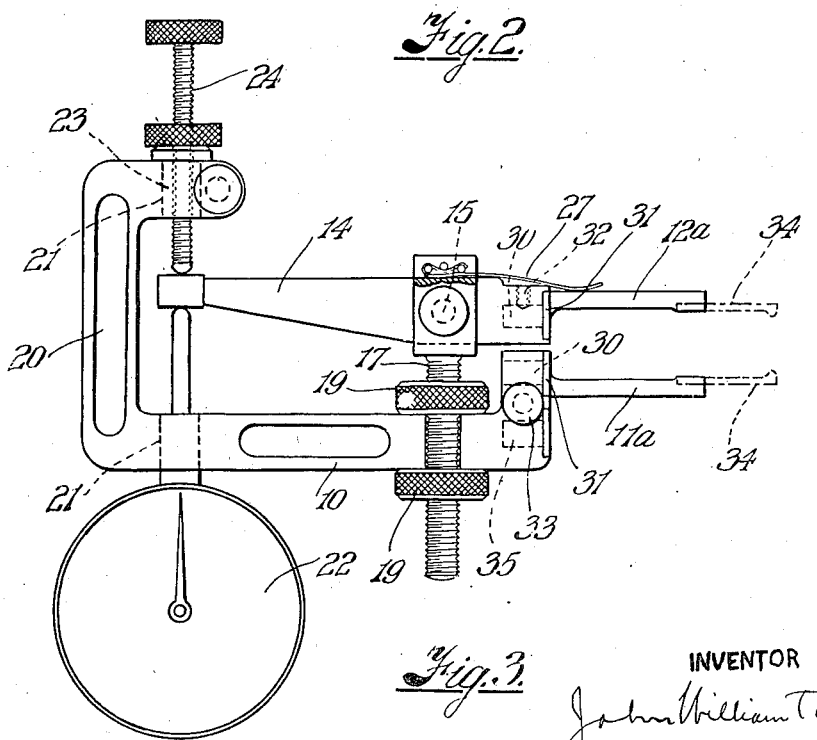

In Figs. 1 and 2 I have shown the improved gauge arranged for internal measurement but both forms of the invention may be adapted for external measurement by reversing the operation of the lever arm, and Fig. 3 shows the instrument illustrated in Fig. 2 adapted in this manner. It will be noted that the lever arm is inverted and the positions of the test indicator 22 and adjusting screw 24 are interchanged for which purpose the bush 23 is mounted in the upper socket 21.

In addition the spring blade 28 is removed, the spring 27 is reverved so that its action is to urge the movable jaw towards the fixed jaw, and the jaws or the detachable nibs, or both, are reversed so that the contact points face each other. The method of using the gauge in this form is similar to that previously described. The jaws having been set the desired distance apart by manipulation of the screw 24 and nuts 19, they are placed across the external surfaces, the distances between which is to be tested, in the manner of calipers and any variation above the standard to which the instrument is set will spread the jaws, thus rocking the lever arm and recording the deviation on the indicator.

It will be understood that the devices illustrated are given by way of example only and that various modifications may be made without departing from the spirit of the invention particularly in the arrangement of interchangeable jaws and nibs. Where the instrument is to be used for internal or external work only, the bush 23 may be dispensed with, the screw 24 being threaded directly in the bracket structure. Finally, it may be found more convenient to substitute for the spring 27 a coiled tension or compression spring extending between the lever arm and frame member or a coiled spring mounted on the lever arm pivot.

I claim:

1. A micrometer gauge or comparator comprising a frame member carrying a fixed jaw, a lever arm pivotally mounted on a standard adjustably supported on said frame member and carrying at one end a second jaw in substantially parallel relation with the fixed jaw, an adjusting screw mounted in the frame member so as to bear against the other end of said lever arm and adapted to set the distance between the jaws to a predetermined measurement, a spring holding said lever arm in engagement with the adjusting screw and a test indicator supported on an extension of the frame member in such manner as to be operated by said lever arm to indicate any deviation of the jaws from the set measurement.

2. A micrometer gauge or comparator comprising a frame member, a pair of jaws adapted to be inserted in the aperture or placed across the surfaces to be measured, one of said jaws being fixed and carried by the frame member, a lever arm carrying at one end the other jaw and having a pivotal support which is adjustable relative to the frame member, and hand operated means engaging the other end of said lever arm for setting the jaws to a predetermined measurement, the said lever arm being adapted to actuate an indicating device for showing any deviation of the jaws from their present position.

3. A micrometer gauge or comparator according to claim 2, wherein said hand operated setting means consists of an adjusting screw mounted in said frame member.

4. A micrometer gauge or comparator according to claim 2, wherein said lever arm is pivotally mounted on a standard having a screw-threaded stem which traverses an aperture formed in said frame member and has clamping nuts thereon for securing it in the adjusted position.

5. A micrometer gauge according to claim 2, wherein said hand operated setting means comprises an adjusting screw engageable with one side of said lever arm and said indicating device comprises a test indicator having a stem engageable with the other side of said lever arm, adjusting screw and test indicator being mounted interchangeably and said lever arm being mounted reversibly in said frame member whereby the gauge may be adapted for internal or external measurement.

6. A micrometer gauge according to claim 2, wherein two ball points are spaced along the length of said fixed jaw and one ball point is provided on the movable jaw and is spaced midway between the points on the fixed jaw for ensuring accurate engagement with the surfaces to be measured.

JOHN WILLIAM TODD.